United States Patent
Bowers et al.

(10) Patent No.: US 6,728,433 B1
(45) Date of Patent: Apr. 27, 2004

(54) FEEDBACK STABILIZATION OF A LOSS OPTIMIZED SWITCH

(75) Inventors: John Edward Bowers, Santa Barbara, CA (US); Roger Jonathon Helkey, Montecito, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 10/155,047

(22) Filed: May 24, 2002

Related U.S. Application Data (62) Division of application No. 09/548,587, filed on Apr. 13, 2000, now Pat. No. 6,456,751.

(51) Int. Cl.[7] .................................................. G02B 6/26
(52) U.S. Cl. ..................... 385/16; 250/227.14; 398/143
(58) Field of Search ........................ 385/16–18, 20–24, 385/30–33, 39, 52, 1, 26, 42, 48, 127; 250/227.14, 227.19, 227.24; 398/143–147

(56) References Cited

U.S. PATENT DOCUMENTS

| | | | |
|---|---|---|---|
| 2,982,859 A | 5/1961 | Steinbrechner |
| 3,492,484 A | 1/1970 | Iti |
| 3,990,780 A | 11/1976 | Dakss |
| 4,003,655 A | 1/1977 | Wasilko |
| 4,053,845 A | 10/1977 | Gould |
| 4,208,094 A | 6/1980 | Tomlinson, III et al. |
| 4,234,145 A | 11/1980 | Leiboff |
| 4,243,297 A | 1/1981 | Elion |
| 4,302,071 A | 11/1981 | Winzer |
| 4,303,303 A | 12/1981 | Aoyama |
| 4,322,126 A | 3/1982 | Minowa et al. |
| 4,365,863 A | 12/1982 | Broussaud |
| 4,421,381 A | 12/1983 | Ueda et al. |
| 4,431,258 A | 2/1984 | Fye |
| 4,432,599 A | 2/1984 | McMahon |
| 4,452,506 A | 6/1984 | Reeve et al. |

(List continued on next page.)

FOREIGN PATENT DOCUMENTS

| | | |
|---|---|---|
| DE | 4224601 A1 | 1/1994 |
| EP | 1 120677 A2 | 8/2001 |
| EP | 1 120989 A1 | 8/2001 |
| GB | 2 175 705 A | 12/1986 |
| JP | 60-107017 | 6/1985 |
| JP | 5-107485 A | 4/1993 |
| JP | 6-180428 | 6/1994 |
| WO | WO 99/66354 | 12/1999 |
| WO | WO 99/67666 | 12/1999 |
| WO | WO 00/20899 | 4/2000 |
| WO | WO 01/33898 A2 | 5/2001 |
| WO | WO 01/39413 A2 | 5/2001 |

OTHER PUBLICATIONS

Janusz Bryzek, Kurt Petersen, & Wendell McCulley, "Micromachines on the March," IEEE Spectrum, pp. 20–31 (May 1994).

(List continued on next page.)

*Primary Examiner*—Akm Enayet Ullah
(74) *Attorney, Agent, or Firm*—Blakely, Sokoloff, Taylor & Zafman LLP (57) ABSTRACT

A system is provided to obtain loss optimized output optical power by way of feedback control and stabilization in an optical signal switching or routing system. The optical signal switching or routing system includes at least two input optical fibers and at least two output optical fibers, a controllable mechanism for directing an optical beam from one of the input optical fibers to one of the output optical fibers, and a mechanism for measuring the optical power applied to output optical fiber. The measuring mechanism provides a measure of the output optical power through a signal processing apparatus to a control apparatus. Possible other inputs to the signal processing apparatus include the input optical power, test optical power, etc. The inputs to the signal processing apparatus are compared and the signal processing apparatus outputs a signal to the control apparatus to provide optimized output power.

17 Claims, 6 Drawing Sheets

U.S. PATENT DOCUMENTS

| | | |
|---|---|---|
| 4,470,662 A | 9/1984 | Mumzhiu |
| 4,474,423 A | 10/1984 | Bisbee et al. |
| 4,498,730 A | 2/1985 | Tanaka et al. |
| 4,512,036 A | 4/1985 | Laor |
| 4,603,975 A | 8/1986 | Cinzori |
| 4,626,066 A | 12/1986 | Levinson |
| 4,644,160 A | 2/1987 | Arimoto et al. |
| 4,677,290 A | 6/1987 | Mitch |
| 4,696,062 A | 9/1987 | LaBudde |
| 4,728,169 A | 3/1988 | Campbell et al. |
| 4,746,195 A | 5/1988 | Auracher et al. |
| 4,758,061 A | 7/1988 | Horn |
| 4,789,215 A | 12/1988 | Anderson et al. |
| 4,823,402 A | 4/1989 | Brooks |
| 4,848,999 A | 7/1989 | Taylor |
| 4,866,699 A | 9/1989 | Brackett et al. |
| 4,892,388 A | 1/1990 | Taylor |
| 4,896,935 A | 1/1990 | Lee |
| 4,927,221 A | 5/1990 | Kiyono |
| 4,932,745 A | 6/1990 | Blonder |
| 4,953,155 A | 8/1990 | Tangonan et al. |
| 4,993,796 A | 2/1991 | Kapany et al. |
| 5,030,004 A | 7/1991 | Grant et al. |
| 5,031,987 A | 7/1991 | Norling |
| 5,077,622 A | 12/1991 | Lynch |
| 5,083,857 A | 1/1992 | Hornbeck |
| 5,097,354 A | 3/1992 | Goto |
| 5,150,245 A | 9/1992 | Smithgall |
| 5,172,262 A | 12/1992 | Hornbeck |
| 5,177,348 A | 1/1993 | Laor |
| 5,204,922 A | 4/1993 | Weir et al. |
| 5,255,332 A | 10/1993 | Welch et al. |
| 5,291,324 A | 3/1994 | Hinterlong |
| 5,333,225 A * | 7/1994 | Jacobowitz et al. .......... 385/93 |
| 5,383,118 A | 1/1995 | Nguyen |
| 5,400,165 A * | 3/1995 | Gnauck et al. ............. 359/161 |
| 5,420,946 A | 5/1995 | Tsai |
| 5,440,654 A | 8/1995 | Lambert, Jr. |
| 5,444,566 A | 8/1995 | Gale et al. |
| 5,450,512 A | 9/1995 | Asakura |
| 5,471,332 A | 11/1995 | Shiragaki et al. |
| 5,488,862 A | 2/1996 | Neukermans et al. |
| 5,524,153 A | 6/1996 | Laor |
| 5,555,558 A | 9/1996 | Laughlin |
| 5,621,829 A | 4/1997 | Ford |
| 5,627,669 A | 5/1997 | Orino et al. |
| 5,629,790 A | 5/1997 | Neukermans et al. |
| 5,629,993 A | 5/1997 | Smiley |
| 5,647,033 A | 7/1997 | Laughlin |
| 5,673,139 A | 9/1997 | Johnson |
| 5,796,880 A | 8/1998 | Ford et al. |
| 5,832,415 A | 11/1998 | Wilkening et al. |
| 5,872,880 A | 2/1999 | Maynard |
| 5,900,983 A | 5/1999 | Ford et al. |
| 5,920,417 A | 7/1999 | Johnson |
| 5,960,132 A | 9/1999 | Lin |
| 5,960,133 A | 9/1999 | Tomlinson |
| 6,002,818 A | 12/1999 | Fatehi et al. |
| 6,044,705 A | 4/2000 | Nuekermans et al. |
| 6,049,412 A | 4/2000 | Bergmann et al. |
| 6,097,858 A | 8/2000 | Laor |
| 6,097,859 A | 8/2000 | Solgaard et al. |
| 6,097,860 A | 8/2000 | Laor |
| 6,101,299 A | 8/2000 | Laor |
| 6,137,926 A | 10/2000 | Maynard |
| 6,157,609 A * | 12/2000 | Shoji et al. .............. 369/275.3 |
| 6,157,663 A * | 12/2000 | Wu et al. ...................... 372/75 |
| 6,201,622 B1 | 3/2001 | Lobbett et al. |
| 6,208,469 B1 | 3/2001 | Matsuura |
| 6,222,679 B1 | 4/2001 | Nevis |
| 6,236,481 B1 | 5/2001 | Laor |
| 6,249,626 B1 | 6/2001 | Bergmann |
| 6,253,001 B1 | 6/2001 | Hoen |
| 6,253,010 B1 | 6/2001 | Belser et al. |
| 6,256,430 B1 | 7/2001 | Jin et al. |
| 6,278,812 B1 | 8/2001 | Lin et al. |
| 6,289,145 B1 | 9/2001 | Solgaard et al. |
| 6,295,154 B1 | 9/2001 | Laor et al. |
| 6,320,998 B1 | 11/2001 | Okayama et al. |
| 6,330,102 B1 | 12/2001 | Daneman et al. |
| 6,347,101 B1 * | 2/2002 | Wu et al. ...................... 372/18 |
| 6,456,751 B1 | 9/2002 | Bowers et al. |

OTHER PUBLICATIONS

Ming C. Wu, "MEMS for Optical and RF Applications." UCLA Extension, Department of Engineering, Information Systems and Technical Management, Engineering: 823.52, Nov. 1–3, 1999.

"Lucent's New All–Optical Router Uses Bell Labs Microscopic Mirrors," Bells Labs press release pp. 104, Nov. 10, 1999. http.//www.bell.labs.com/news/1999/november/10/1.html.

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum, , L. Zhang, and C.R. Giles, "Fully Provisional 112×112 Micro–Mechanical Optical Crossconnect With 35.8Tb/s Demonstrated Capacity," OFC 2000 Tech. Dig., Baltimore, Maryland, pp. 202–204 (Mar. 7–10, 2000).

Erwin Kreyszig, "Advanced Engineering Mathematics," $8^{th}$ Edition, John Wiley & Sons, Inc., pp. 990–1008 (1999).

Lih Y. Lin and Evan L. Goldstein, "Micro–Electro–Mechanical Systems (MEMs) for WDM Optical–Crossconnect Networks," IEEE, pp. 954–957 (1999).

* cited by examiner

FEEDBACK STABILIZATION OF A LOSS OPTIMIZED SWITCH

CROSS-REFERENCE TO RELATED APPLICATIONS

The present application is a divisional of U.S. patent application Ser. No. 09/548,587, filed Apr. 13,2000, now U.S. Pat. No. 6,456,751, entitled FEEDBACK STABILIZATION OF A LOSS OPTIMIZED SWITCH, which is assigned to the same assignee as the present application.

STATEMENT REGARDING FEDERALLY SPONSORED RESEARCH OR DEVELOPMENT

Not applicable.

BACKGROUND OF THE INVENTION

1. Field of the Invention

The present invention relates to the field of fiber optics, and more particularly to the field of optical signal switching, routing, and monitoring.

Description of Related Art

Figure 1:
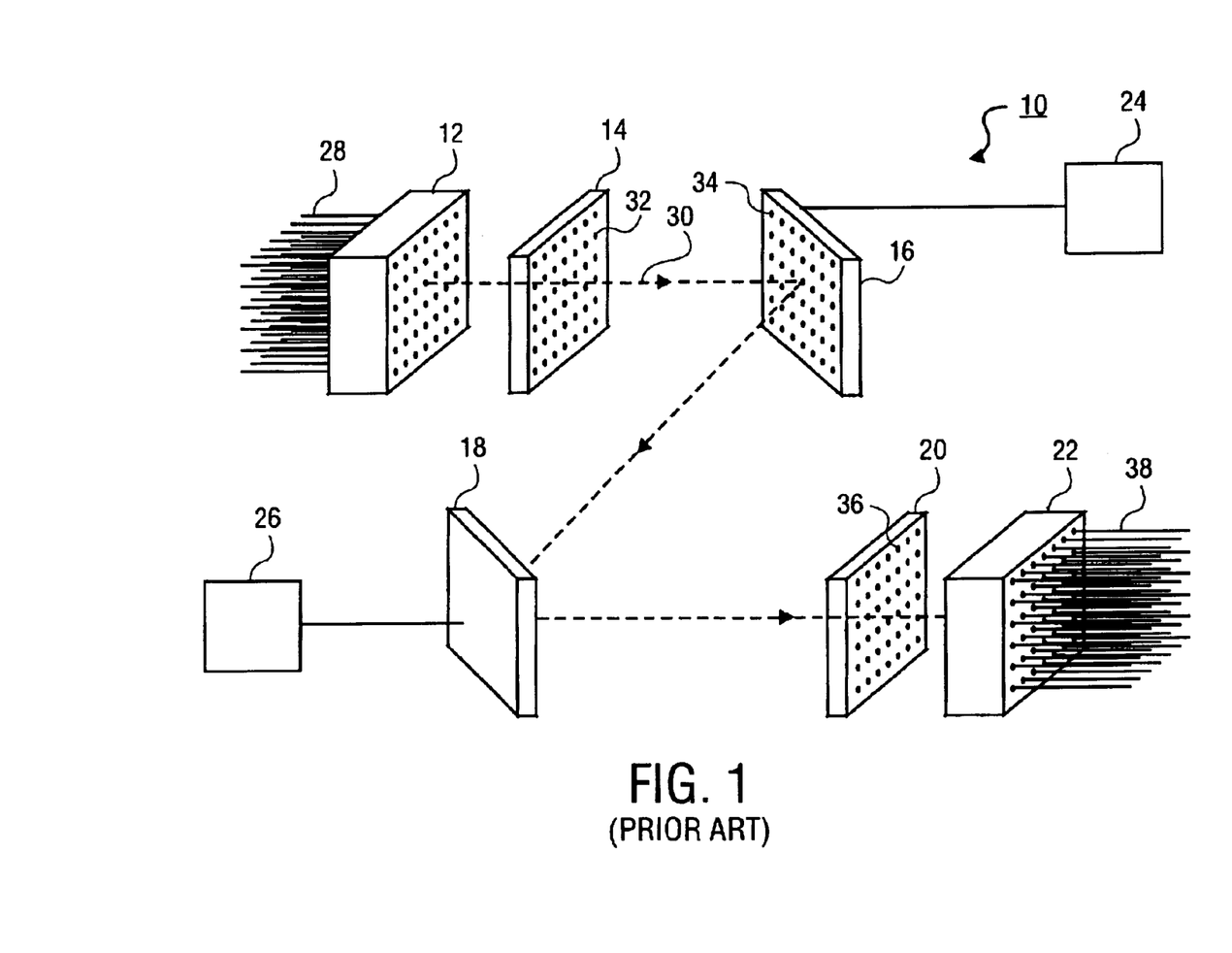
FIG. 1 is an illustration of a prior art optical switching apparatus employing multiple reflective devices according to the prior art.

FIG. 1 is an illustration of an exemplary optical switching system 10 for practicing the invention. For example, optical switching system 10 may represent a 3-dimensional optical switching system. A 3-dimensional optical switching system allows for optical coupling between input fibers and output fibers in different planes using lens arrays and mirror arrays. The lens arrays and mirror arrays provide proper angle and position of light beams traveling from input fibers to output fibers. That is, a light beam must leave and enter a fiber in a direct, beam path.

Referring to FIG. 1, a generalized optical switching system 10 includes input fiber array 12, first lens array 14, first beam steering apparatus (e.g., Micro-Electro-Mechanical-System, or MEMS, mirror array) 16, second beam steering apparatus (e.g., MEMS mirror array) 18, second lens array 20, and output fiber array 22. System 10 might also include additional or different elements, such as apparatus 24 and 26 for controlling the mirror arrays 16 and 18, respectively.

Input fiber array 12 provides a plurality of input optical fibers 28 for forming light beams 30 transmitted to (and through) first lens array 14. First lens array 14 includes a plurality of optical lenses 32, which are used to focus beams of light from each input optical fiber 28 to individual mirror devices 34 on mirror array 16. Mirror devices 34 may be electronically, magnetically, or otherwise individually movable to control the beam path of each beam formed by the input optical fibers 28.

Mirror device 34 may be a gimbaled mirror device having a rectangular, elliptical, circular, or other appropriate shape. The plurality of mirror devices 34 for mirror array 16 can pivot a reflective component thereof (not specifically shown in FIG. 1) to redirect or reflect light to varying mirror devices on second mirror array 18. Second mirror array 18 also includes a plurality of mirror devices, similar to those described with regard to first mirror array 16, which are used to redirect and reflect light beams to varying lenses 36 on second lens array 20. Second lens array 20 focuses beams of light from second mirror array 18 to individual output fibers 38 of output fiber array 22.

Optical switching system 10 allows light beams from any input fiber 28 of input fiber array 12 to be redirected to any output fiber 38 of output fiber array 22. The above arrangement, including mirror arrays 16, 18 may also be used in scanning systems, printing systems, display systems, and other systems that require redirecting beams of light.

It should be noted that for each input optical fiber 28 there is an associated mirror device (such as mirror device 34) on mirror array 16, and for each output optical fiber 38 there is an associated mirror device on mirror array 18. In general, there will be a minimum of two input optical fibers and two output optical fibers, and correspondingly two mirrors on each of arrays 16 and 18. There need not be an identical number of input and output optical fibers, although this is typically the case. Also, there will typically be more than two such input and output optical fibers.

Figure 2:
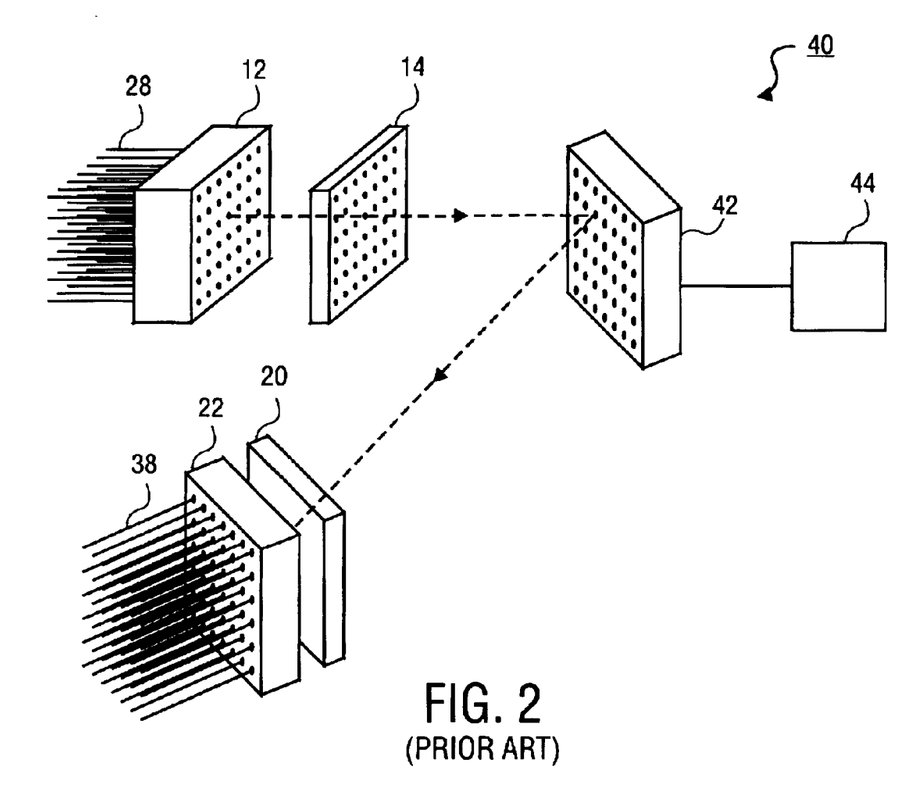
FIG. 2 is an illustration of a prior art optical switching apparatus employing a single reflective device according to the prior art.

In general, many types of beam steering arrangements will lend themselves to use with the present invention. For example, two mirror arrays 16, 18 are shown in FIG. 1. Good coupling of a beam into an output optical fiber typically requires controlling fiber position and angle in two dimensions, in addition to the two dimensions of mirror rotation. So, four degrees of freedom are required. However, in some instances, few or greater degrees of freedom may suffice. For example, a one-mirror array shown FIG. 2, where a single mirror array 42 controlled by apparatus 44 is used for directing the beams, or a three or more mirror array arrangement (not shown) may be appropriate. Also, while the above description has been in terms of reflective beam steering, other types of beam steering, such as refractive or diffractive beam steering may employ the present invention with equal advantage (although not otherwise discussed in detail herein).

Coupling a light beam from an input optical fiber to an output optical fiber requires that the mirrors of mirror arrays 16, 18 be angularly controlled, and that the mirror angles be precise. Such precision, and a degree of control thereover, is needed to optimize output optical power. To obtain such precise positioning, one can either employ or not employ knowledge of actual mirror angle. One method to determine the mirror angles is to add structures to the mirrors that indicate the angle of mirror rotation. One example of this is torsion sensors attached to suspension elements associated with each mirror. See, for example, U.S. Pat. No. 6,044,705. This approach has several disadvantages, including a relatively large number of required interconnections, added processing and manufacturing steps, greater risk of yield losses, etc.

BRIEF SUMMARY OF THE INVENTION

The present invention recognizes the limitations of direct measurement of mirror position, and presents an alternative technique for allowing optimization of output optical power. Our approach is to use an optical signal incident on each mirror to determine the mirror's angle. According to one embodiment, the output optical power is measured, for example at each output optical fiber, and compared with either the input optical power or a reference value, and based on the results of the comparison, a mirror or mirrors are rotated, and output power measured again. This process is referred to herein as feedback stabilization control of mirror position. According to another embodiment, this may be an iterative process, to allow narrowing in on a desired mirror angle for loss optimized output optical power.

BRIEF DESCRIPTION OF THE SEVERAL VIEWS OF THE DRAWING

The features and advantages of the present invention are described and will be apparent to those skilled in art from the following detailed description taken together with the accompanying figures, in which like reference numerals in the various figures denote like elements.

DETAILED DESCRIPTION OF THE INVENTION

The present invention will now be described in detail with reference to examples thereof. However, such examples are for illustrative purposes, and should not be read as limiting the present invention, the scope of which being defined by the claims hereof.

Figure 3:
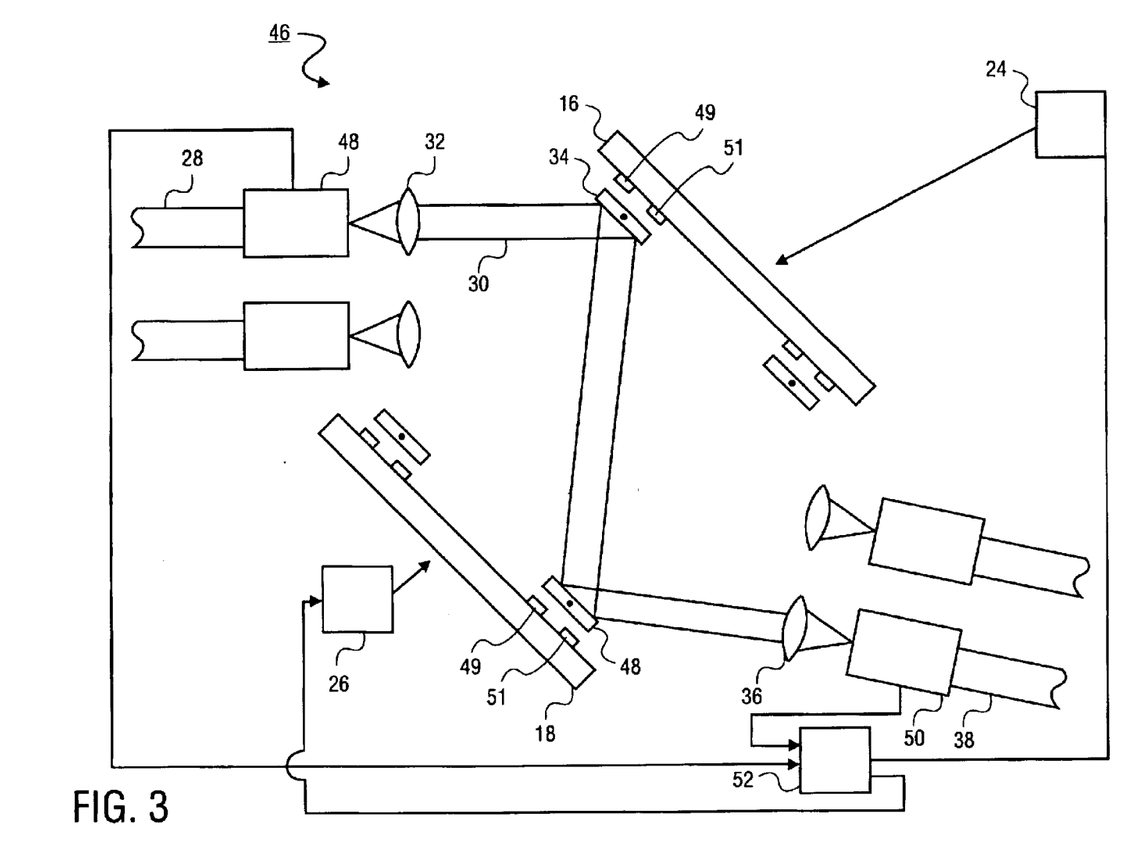
FIG. 3 is an illustration of an optical system according to the present invention.

With reference to FIG. 3, there is shown therein a system 46 suitable for implementation of one embodiment of the present invention. For illustration purposes only, there is shown only two input and output optical fibers, although it will be readily understood that the present description applies equally to a virtually arbitrary greater number of such fibers. In one embodiment lenses 32 may be formed from an ACT Microdevices 8-fiber collimator array (ACT Microdevices, Radford, Va.). System 46, in addition to those elements discussed with reference to FIG. 1, further includes input optical power measurement apparatus 48 associated with each input optical fiber 28 and output optical power measurement apparatus 50 associated with each output optical fiber 38, each optical power measurement apparatus providing output signals representative of measured optical power. System 46 further including a signal processing apparatus 52, connected to receive as inputs the output signals provided by optical power measurement devices 48 and 50. Signal processing apparatus 52 provides output signals which are representative of a calculated comparison of the input optical power measured by optical power measurement apparatus 48 and output optical power measured by optical power measurement apparatus 50. These signals are used by mirror control apparatus 24, 26 to, for example, generate voltages which applied to electrodes such as 49, 51, to control the angular position of mirror 34, 48. In one embodiment, mirrors 34, 48 may be composed of CMS Mikrosysteme Mikro-scanner 1.2 mirrors (CMS Mikrosysteme GmbH, Chemnitz, Germany).

As will be further discussed, the calculated comparison may be one of a large number of different types of analytical comparisons. In addition, control apparatus 24 and 26 are configured such that they receive as inputs the output signals from signal processing apparatus 52. System 46 is thereby configured such that an analytical comparison of the input and output optical powers may be made, and the angular position of either mirror 34, mirror 48, or both may be adjusted in response to that analytical comparison in order to optimize output optical power.

The aforementioned analytical comparison is in part a function of the number of degrees of freedom of the system. For example, in the simplest case, mirror 34 might rotate in only one plane, so the mirror control apparatus 24 and/or 26 would have only one output signal for each mirror. Techniques for maximizing or minimizing the output of a single variable are well known, for example using a steepest decent method (see, e.g., E. Kreyszig, 'Advanced Engineering Mathematics', John Wiley & Sons 1993). However, in other systems two variable mirror planes are required for loss optimization, so the mirror controller 24, 26 will have two outputs. This optimization of a function of multiple variables can be done with a variety of techniques, such as random search techniques and gradient search techniques (see, e.g., E. Kreyszig, 'Advanced Engineering Mathematics', John Wiley & Sons 1993). Optimization techniques typically start with a random or periodic search to find a good optimization starting point, then a gradient search to find the local optimum.

It is often desired to optimize a system such as system 46 for minimum loss. In such a case, the analytical comparison will be made such that the loss optimized optical power is the greatest possible optical output power. In such a case, the signal processing apparatus 52 may include a ratio circuit, and serve to calculate the ratio of output optical power to input optical power. The greater the ratio, the greater the output optical power. For example, a ratio of better than one-half would indicate a loss of less than 3 dB. However, it may be desired to have every channel (i.e., the signal on each output optical fiber) of the system have approximately the same optical loss. In this case channels with loss lower than some threshold (e.g., average) might be loss optimized to have less than minimum loss to equalize power to other channels. In other applications, it might be desired to have the same optical output power for every channel. In this case, channels with strong input signals might be loss optimized to have higher loss. It may alternatively be desirable to maintain an individual channel at a preset or calculated power level, for example when the input optical power is subject to power variations. In such a case, the optical power stabilization may be achieved by monitoring fluctuations at the input optical power measure and controlling attenuation so as to stabilize output optical power.

Figure 4:
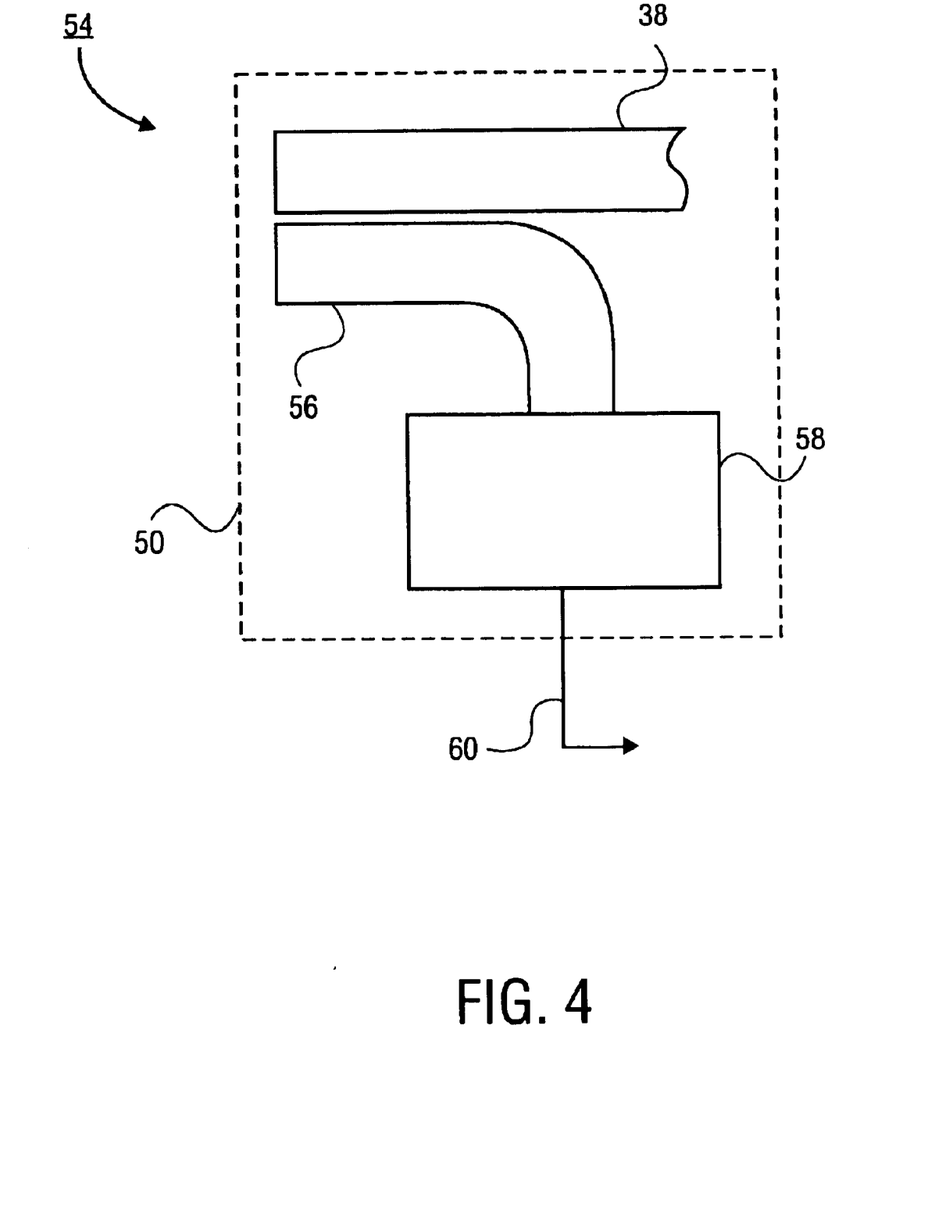
FIG. 4 is an illustration of an optical power measurement apparatus as employed by one embodiment of the present invention.

In one embodiment 54 of the present invention shown in FIG. 4, the power coupled into an output optical fiber 38 is determined by sampling the power in the fiber with a fiberoptic power splitter 56 proximate the output optical fiber, and a photodetector 58 to convert this sampled power to an electrical level, which may be output at output 60. In one embodiment, the fiberoptic power splitter is a ThorLabs #1020A-10 10/90 optical power splitter (ThorLabs, Inc., Newton, N.J.) and the photodetector is an Epitaxx ETX500T8 (Epitaxx Optoelectronic Devices, West Trenton, N.J.).

This measurement of the optical output power is not a direct measurement of optical loss of the system, and fluctuations of input optical power would make it difficult to provide a mirror angle corresponding to an optimized output optical power, whether is be minimum loss or some other optimization. Therefore, in embodiment 46 shown in FIG. 3, the optical loss of the system is measured by sampling the power at the input of the fiber 28, for example by using an optical power splitter 56 and photodetector 58, as shown and described in FIG. 4, at the input optical fiber as well. The optical loss may be found, for example, from the ratio of the output power to the ratio of the input power.

Figure 5:
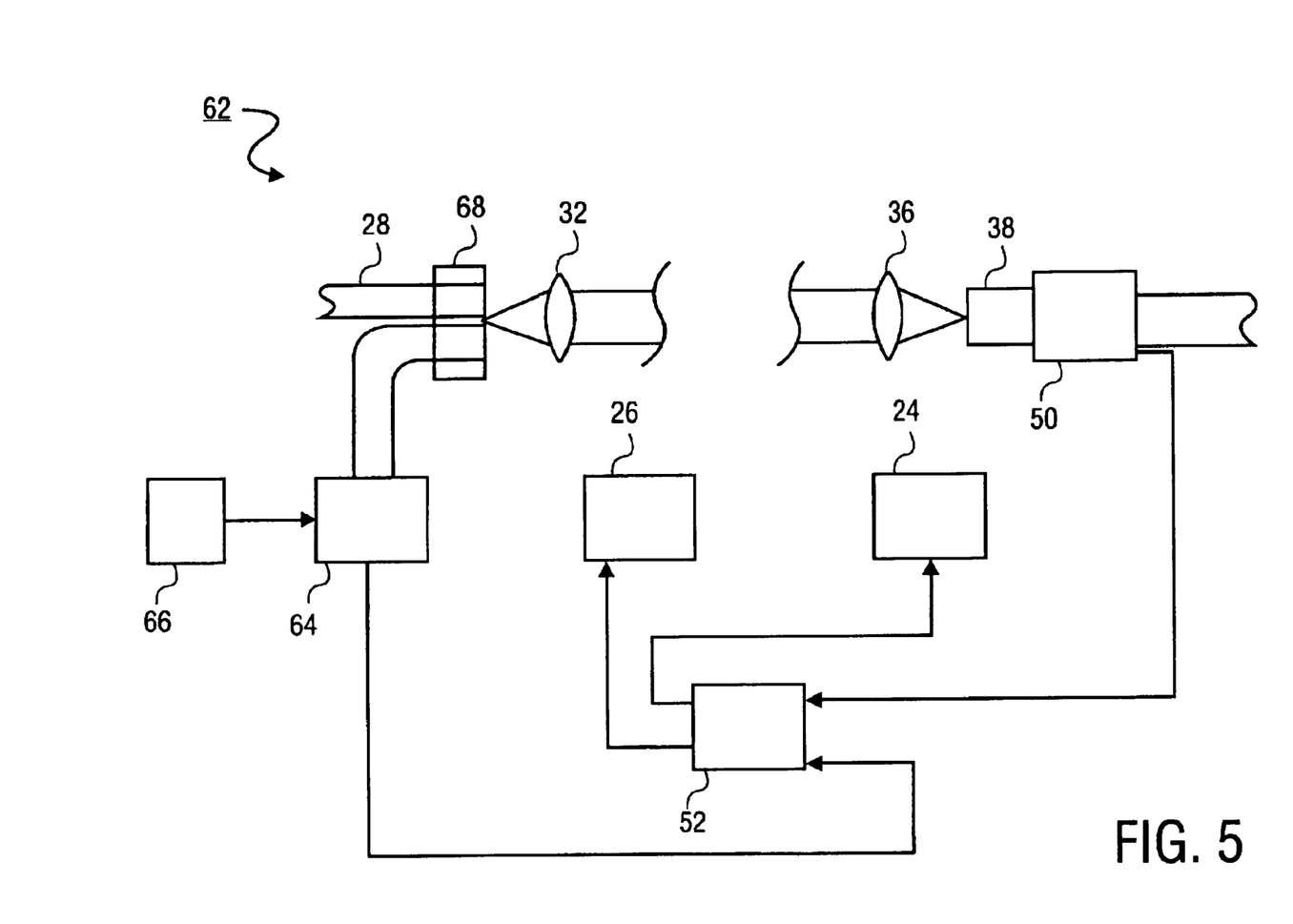
FIG. 5 is an illustration of an optical system according to an alternative embodiment of the present invention.

In the embodiment of FIG. 3, the feedback stabilization relies on the input optical signal delivered by the input optical fiber 28. However, in general, the output optical power is compared to a reference optical power. According to another embodiment 62 of the present invention, the output optical power may be compared to a reference optical power, other than input optical power, and control performed as a function of that comparison. For example, as shown in FIG. 5, an external optical source 64 (such as a Fujitsu FLD148G3NL-B 1.475 nm laser with an optical power splitter to allow one laser to be used with more than one channel, from Fujitsu Compound Semiconductor, Inc., San Jose, Calif.) under separate control 66 is used, for example, through a wavelength division multiplexer fiber coupler 68 (such as model DiCon PCC-14-15 available from DiCon Fiberoptics, Inc., Berkeley, Calif.) as a reference optical power source, having a known or measured optical power. This known or measured optical power may be used as an input to signal processing apparatus 52, which performs the previously discussed analytical comparison to thereby provide control signals to mirror control apparatus 24, 26. Embodiment 62 may serve several different purposes, such as system calibration, etc.

Figure 6:
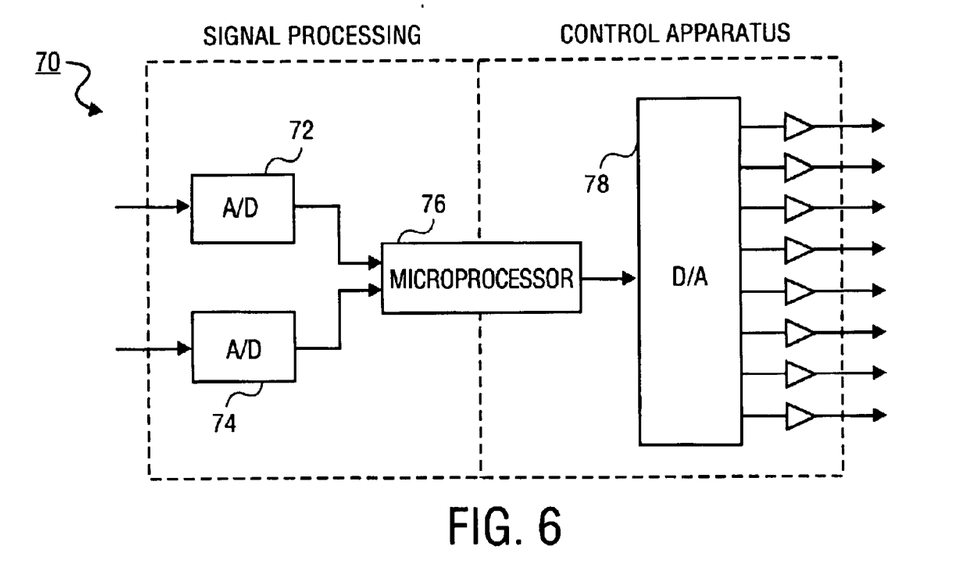

According to an embodiment 70 of the present invention shown in FIG. 6, the ratio of the input to output optical power is computed by two analog to digital (A/D) converters 72, 74 to digitize the input power level and output power level, and a microprocessor 76 to perform the analytical comparison function, such as division. Microprocessor 76 calculates the voltages needed to set the desired mirror angles, and converts this to an analog voltage with multiple digital to analog (D/A) converters 78. In one implementation, the microprocessor is a Microchip PIC16C770 (Microchip Corp., Ariz.) with 6 integrated A/D converters. The microprocessor takes the ratio of the input and output signal level, and computes the new mirror control voltages. The new voltages are sent to a Linear Technology LTC1257 D/A converter (Digi-Key, Thief River Falls, Minn.), with a maximum output voltage of approximately 10V. The mirrors typically require high voltage to cause mirror deflection. High voltage drivers to increase the voltage for the mirrors can be built using high voltage MOSFET devices using standard commercial practice.

Figure 7:
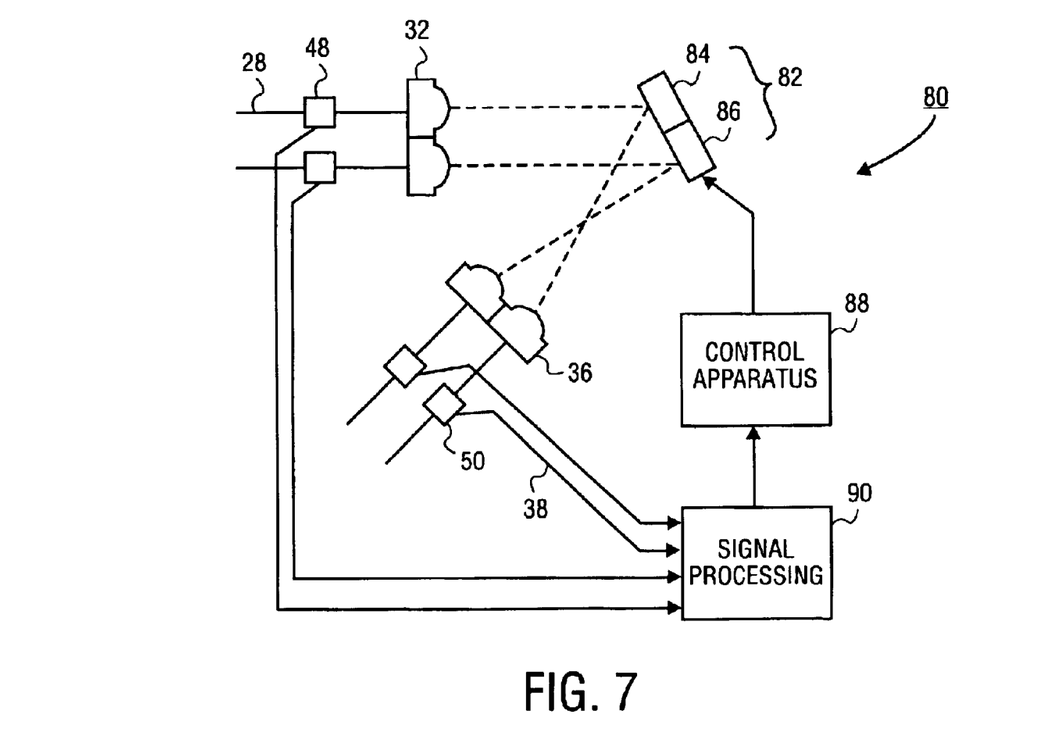

While the above describes the invention with reference to several specific exemplary embodiments, numerous variations and alternate embodiments are contemplated and will be appreciated by one skilled in the art. For example, with reference to FIG. 7, there is shown therein a simple embodiment 80 in which only a single beam steering apparatus 82 is shown. In embodiment 80, beam steering apparatus 82 consists of two independently controllable beam steering sub-apparatus 84, 86. Signal processing and control are as otherwise previously described. Likewise, an arrangement with more than two beam steering apparatus, although not shown, is merely an extension of the previous description. Thus, the spirit and scope of the present invention will be defined by the appended claims, with no is intended limitation thereof by the preceding description.

What is claimed is:

1. A method of optimizing the output power of an optical system of the type in which an input light beam is steered by a controllable beam steering apparatus, comprising:

determining the output optical power of the optical system;

performing a comparison of the output optical power to a reference optical power; and controlling the beam steering apparatus as a function of the comparison to optimize the output optical power, wherein the beam steering apparatus is comprises an array of independently moveable mirrors, each mirror of the array being moved by a control apparatus applying a control level to one or more electrodes associated with the mirror under control of a controller, further wherein controlling the beam steering apparatus comprises producing a control signal and providing said control signal to the control apparatus, the control apparatus causing the control level to be applied to the one or more electrodes in response to the control signal.

2. A method of optimizing a fiber-coupled output power of an optical switch comprising:

inputting a plurality of input optical signals from a plurality of input optical fibers;

collimating the plurality of input optical signals to form a plurality of free-space input optical beams;

using a controllable beam steering apparatus to steer the plurality of free-space input optical beams to form a plurality of free-space output optical beams;

coupling the plurality of free-space output optical beams into a plurality of output optical fibers to form a plurality of output optical signals;

measuring the optical power of the output optical signals; and controlling the beam steering apparatus as a function of the measured optical power of the output optical signals.

3. The method of claim 2, where measuring the optical power of the output optical signals includes performing a comparison of the output powers of the plurality of optical signals to a plurality of reference optical powers.

4. The method of claim 2, wherein measuring the optical power of the output optical signals includes performing a comparison of the power of the plurality of output optical signals to the power of the plurality of input optical signals.

5. The method of claim 4, wherein performing a comparison includes taking a ratio of the power of an output optical signal to the power of input optical signal, and wherein controlling the beam steering apparatus includes maximizing the ratio of output signal optical power to input signal optical power.

6. The method of claim 2, wherein the beam steering apparatus comprises an array of independently moveable mirrors, each mirror of the array being moved by a control apparatus applying a control level to one or more electrodes associated with the mirror under control of a controller, further wherein controlling the beam steering apparatus comprises producing a control signal and proving said control signal to the control apparatus, the control apparatus causing the control level to be applied to one or more electrodes in response to the control signal.

7. A method of optimizing a fiber-coupled output power of an optical switch comprising:

inputting at least a first and second input optical signal;

converting the input optical signals to free-space optical beams, using mirrors that rotate in two axes to steer the input optical beams to output mirrors that rotate in two axes forming output optical beams;

steering the output optical beams with the output mirrors, coupling the optical beams into output optical fibers to form at least a first and second output optical signal;

measuring the optical power of the output optical signals; and controlling angles of the input mirrors and output mirrors to optimize the measured optical power of the output optical signals.

8. The method of claim 7, where the input mirrors are part of an input mirror array, and the output mirrors are part of an output mirror array.

9. The method of claim 7, where the input mirrors and output mirrors are part of a single mirror array.

10. The method of claim 7, where optimizing the measured optical power of the output optical signals comprises measuring the power of the input optical signals, taking the ratio of the output optical powers to the respective input optical powers, and maximizing the ratios of output optical power to input optical power.

11. A method of optimizing a fiber-coupled output power of an output switch comprising:
   inputting at least a first and second input optical signal;
   converting the input optical signals to free-space optical beams;
   using mirrors that rotate in two axes to steer the input optical beams to output mirrors that rotate in two axes forming output optical beams;
   steering the output optical beams with the output mirrors;
   coupling the optical beams into output optical fibers to form at least a first and second output optical signal;
   measuring the optical power of the output optical signals;
   receiving the output optical power measurements with a signal processing apparatus;
   controlling of the input mirrors and output mirrors with the signal processing apparatus; and
   optimizing angles of the input mirrors and output mirrors with the signal processing apparatus to optimize the measured optical power of the output optical signals.

12. The method of claim 11, where the signal processing apparatus also receives the input optical power measurements.

13. The method of claim 12, wherein optimizing the measured optical power of the output optical signals includes taking a ratio of the power of an output optical signal to the power of input optical signal, and optimizing the angles of the input and output mirrors includes maximizing this ratio of output signal optical power to input signal optical power.

14. A method of optimizing fiber-coupled output power of an optical switch comprising:
   inputting at least a first and second input optical signal;
   converting the input optical signals to free-space optical beams;
   using mirrors that rotate in two axes to steer the input optical beams to output mirrors that rotate in two axes forming output optical beams;
   steering the output optical beams with the output mirrors;
   coupling the optical beams into output optical fibers to form at least a first and second output optical signal;
   measuring the optical power of the output optical signals;
   converting the measurement of optical power to digital values;
   receiving the output optical power measurements with a signal processing apparatus;
   generating control signals for the input mirrors and output mirrors;
   converting the control signals to analog control levels;
   controlling the input mirrors and output mirrors with the analog control levels; and
   optimizing the angles of the input mirrors and output mirrors with the analog control levels to optimize the measured optical power of the output optical signals.

15. The method of claim 11, where the signal processing apparatus also receives the input optical power measurements, after these levels are converted to digital values.

16. The method of claim 12, wherein optimizing the measured optical power of the output optical signals includes taking a ratio of the power of an output optical signal to the power of input optical signal, and optimizing the angles of the input and output mirrors includes maximizing this ratio of output signal optical power to input signal optical power.

17. The method of claim 12, wherein generating the control signals for the input mirrors and output mirrors is performed by a microprocessor.

* * * * *